(12) United States Patent
Baud et al.

(10) Patent No.: US 10,429,242 B2
(45) Date of Patent: Oct. 1, 2019

(54) MULTISPECTRAL DETECTION DEVICE

(71) Applicant: SOCIETE FRANCAISE DE DETECTEURS INFRAROUGES—SOFRADIR, Palaiseau (FR)

(72) Inventors: Laurent Baud, Bevenais (FR); Alexandre Maltere, Saint-Egreve (FR)

(73) Assignee: SOCIETE FRANCAISE DE DETECTEURS INFRAROUGES—SOFRADIR, Palaiseau (FR)

( * ) Notice: Subject to any disclaimer, the term of this patent is extended or adjusted under 35 U.S.C. 154(b) by 141 days.

(21) Appl. No.: 15/802,504

(22) Filed: Nov. 3, 2017

(65) Prior Publication Data
US 2018/0120160 A1 May 3, 2018

(30) Foreign Application Priority Data
Nov. 3, 2016 (FR) ..................... 16 60655

(51) Int. Cl.
| | | |
|---|---|---|
| G01J 3/36 | (2006.01) | |
| G01J 1/44 | (2006.01) | |
| G01J 1/46 | (2006.01) | |
| G01J 3/427 | (2006.01) | |
| G01J 3/28 | (2006.01) | |

(Continued)

(52) U.S. Cl.
CPC . *G01J 3/36* (2013.01); *G01J 1/44* (2013.01); *G01J 1/46* (2013.01); *G01J 3/2803* (2013.01); *G01J 3/427* (2013.01); *G01J 3/50* (2013.01); *H04N 5/2354* (2013.01)

(58) Field of Classification Search
CPC .... G01J 3/36; G01J 3/2803; G01J 3/50; G01J 3/427; G01J 1/46; G01J 1/44; H04N 5/2354
See application file for complete search history.

(56) References Cited

U.S. PATENT DOCUMENTS

| | | |
|---|---|---|
| 4,227,808 A | 10/1980 | Yuasa |
| 6,803,555 B1 | 10/2004 | Parrish et al. |
| 9,116,040 B2 * | 8/2015 | Maltere ..................... G01J 1/18 |

(Continued)

FOREIGN PATENT DOCUMENTS

| | | |
|---|---|---|
| EP | 0519105 A1 | 12/1992 |
| EP | 2302905 B1 | 4/2014 |
| EP | 2863192 A1 | 4/2015 |

*Primary Examiner* — Tony Ko
(74) *Attorney, Agent, or Firm* — Oliff PLC

(57) ABSTRACT

The multispectral detection device comprises first and second photodetectors sensitive to two different wavelengths. The two photodetectors are connected to two integration capacitors of two different readout circuits. Two reset circuits are configured so as to initialise the two integration capacitors separately. A first synchronisation circuit is connected to the first readout circuit and to the synchronisation signal and clock signal generators. The first synchronisation circuit is configured in such a way as to
  define the frame by detection of a leading edge of the synchronisation signal,
  count the number of occurrences of a trailing edge of the clock signal,
  initiate or terminate a data acquisition phase when the number of occurrences of trailing edges is equal to a threshold value recorded in a register of the first synchronisation circuit.

17 Claims, 4 Drawing Sheets

(51) Int. Cl.
*G01J 3/50* (2006.01)
*H04N 5/235* (2006.01)

(56) References Cited

U.S. PATENT DOCUMENTS

2011/0260629 A1 10/2011 Uedaira et al.
2013/0020472 A1 1/2013 Machida et al.

* cited by examiner

MULTISPECTRAL DETECTION DEVICE

BACKGROUND OF THE INVENTION

The invention relates to an electromagnetic detection device.

The invention also relates to a management method of an electromagnetic detection device.

STATE OF THE ART

In the field of detection devices, in order to collect a maximum amount of data on a scene that is being observed, it is advantageous to use several different spectral bands.

Several detectors are used and are associated with different spectral bands. In this way, each detector collects a specific data item of the observed scene in its spectral band which facilitates analysis by cross-relating the different data.

A simple way to produce such a detection device is to associate several photodetectors which are configured to detect a specific spectral band. Each photodetector is associated with a readout circuit which will store the electric charges representative of the received data.

The electric data generated is then sent to a processing circuit which analyses the different data to provide data able to be used by the user. In such a circuit, each photodetector is associated with a readout circuit and each readout circuit is associated with a processing circuit. A processing circuit can be associated with several readout circuits.

These detection devices prove to be difficult to use as they are generally configured for precise illumination ranges in the first spectral band and the second spectral band. It then becomes apparent that the detection devices regularly operate under unfavourable conditions.

OBJECT OF THE INVENTION

One object of the invention is to provide a detection device that can be used under more varied illumination conditions.

The detection device comprises at least:
a first photodetector sensitive to a first wavelength,
a second photodetector sensitive to a second wavelength,
a first readout circuit provided with a first integration capacitor connected to the first photodetector so as to store the electric charges emitted by the first photodetector,
a second readout circuit provided with a second integration capacitor connected to the second photodetector so as to store the electric charges emitted by the second photodetector,
first and second reset circuits configured so as to respectively reset the first integration capacitor and second integration capacitor,
a generator of a synchronisation signal,
a generator of a clock signal,
a first synchronisation circuit connected to the first readout circuit, to the generator of the synchronisation signal and to the generator of the clock signal, the first synchronisation circuit being configured in such a way as to
define a frame by means of detection of a first predefined pattern of the synchronisation signal,
count the number of occurrences of a second predefined pattern in the clock signal,
initiate or terminate a data acquisition phase in the frame when the number of occurrences of a second predefined pattern in the clock signal is equal to a first threshold value recorded in a register of the first synchronisation circuit.

In one development, a second synchronisation circuit is connected to the second readout circuit, to the generator of the synchronisation signal and to the generator of the clock signal. The second synchronisation circuit is configured in such a way as to
define the frame by means of detection of the first predefined pattern of the synchronisation signal,
count the number of occurrences of a fourth predefined pattern in the clock signal,
initiate or terminate a data acquisition phase in the frame when the number of occurrences of the fourth predefined pattern in the clock signal is equal to a second threshold value recorded in a register of the second synchronisation circuit.

In a particular embodiment, the fourth predefined pattern is identical to the second predefined pattern.

In a preferential embodiment, the first synchronisation circuit is configured so as to initiate counting of the number of occurrences of the second predefined pattern after detection of a third predefined pattern in the synchronisation signal.

In another embodiment, the first synchronisation circuit is configured so as to initiate or terminate the data acquisition phase after detection of a fifth predefined pattern in the synchronisation signal.

In another alternative embodiment, the first readout circuit is configured to perform reset of the first integration capacitor while the first photodetector is connected to the first integration capacitor and the first synchronisation circuit is configured so as to initiate the acquisition phase by terminating the reset phase.

It is further possible to provide for the first predefined pattern to be a leading edge and for the third predefined pattern to be a trailing edge. As a variant, it is possible to provide for the first predefined pattern to be a trailing edge and for the third predefined pattern to be a leading edge.

In a particular embodiment, the second predefined pattern is a trailing edge or a leading edge.

In a particular embodiment, the device comprises a plurality of first photodetectors connected to a plurality of first readout circuits and a plurality of second photodetectors connected to a plurality of second readout circuits, the plurality of first readout circuits being connected to the first synchronisation circuit.

It is further possible to provide for the plurality of second readout circuits to be connected to the second synchronisation circuit.

It is a further object of the invention to provide a management method of a detection device.

The management method of a detection device comprises the following steps:
providing the detection device comprising at least:
a first photodetector sensitive to a first wavelength,
a second photodetector sensitive to a second wavelength,
a first readout circuit provided with a first integration capacitor connected to the first photodetector so as to store the electric charges emitted by the first photodetector,
a second readout circuit provided with a second integration capacitor connected to the second photodetector so as to store the electric charges emitted by the second photodetector, first and second reset circuits configured so as to respectively reset the first integration capacitor and the second integration capacitor, detecting a first predefined pattern in a synchronisation signal to initiate a frame for the first and second readout circuits, counting the number of occurrences of a second predefined pattern in a clock signal, comparing said number of occurrences with a threshold value, when the number of occurrences reaches the threshold value, the first readout circuit initiates or terminates a reset phase of the first integration capacitor or a data acquisition phase.

BRIEF DESCRIPTION OF THE DRAWINGS

Other advantages and features will become more clearly apparent from the following description of particular embodiments of the invention given for non-restrictive example purposes only and represented in the appended drawings, in which.

DETAILED DESCRIPTION

Figure 1:
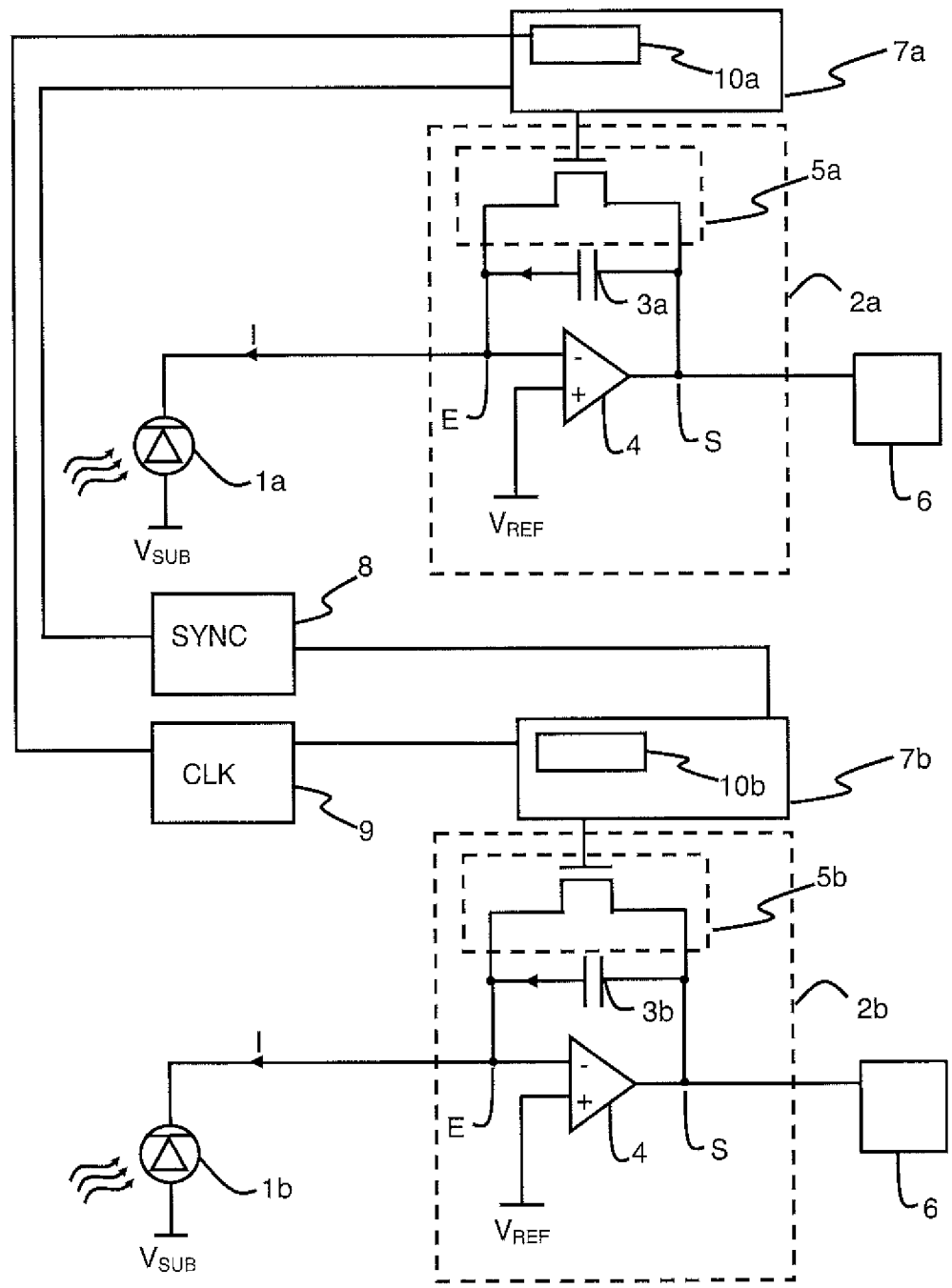
FIG. 1 represents, in schematic manner, an embodiment of a detection device provided with two photodetectors.

FIG. 1 illustrates an electromagnetic detection device which comprises at least a first photodetector 1a sensitive to a first wavelength range also called first spectral band and a second photodetector 1b sensitive to a second wavelength range also called second spectral band.

In a particular embodiment, the second wavelength range can be identical to the first wavelength range. In an alternative embodiment, the second wavelength range is different from the first wavelength range, preferably without overlapping in the wavelength ranges.

The detection device can be configured to detect electromagnetic signals in a plurality of spectral bands, for example N spectral bands, with N an integer greater than or equal to 2. The detection device can therefore comprise at least N different photodetectors configured to detect signals in N different spectral bands.

The first and second photodetectors 1a and 1b can be formed by any type of suitable detectors, for example by a photodiode, a quantum well detector or a multi-quantum well detector. Other types of photodetectors are also possible. The first and second photodetectors 1a and 1b can be fabricated in identical or different architectures. The power supply conditions of photodetectors 1a and 1b can be different. It is therefore possible to have different voltages $V_{SUB}$. The voltages are represented as being identical in the embodiment illustrated in FIG. 1.

The first photodetector 1a is electrically connected to an input E of a first readout circuit 2a. The second photodetector 1b is electrically connected to an input E of a second readout circuit 2b which is distinct from the first readout circuit 2a. Readout circuits 2a and 2b are configured to transform current data emitted by photodetectors 1a and 1b into voltage data for example by means of a load which is preferentially a capacitive load 3.

Readout circuit 2a, 2b can be produced using an architecture of direct injection, buffered direct injection, or source follower type, or by a capacitive trans-impedance amplifier. Depending on the architectures, the integration capacitor can be in direct contact with the detector, but it is also possible to have a connection by means of a transistor as for example in a forward-biased architecture.

In an embodiment illustrated in FIG. 1, the first and second readout circuits 2a and 2b each comprise an integration capacitor 3a, 3b which is configured to store electric charges emitted by the associated photodetector 1. In the example illustrated in FIG. 1, an assembly with a capacitive transimpedance amplifier is illustrated. The integration capacitor 3 is connected in negative feedback with an amplifier 4. The power supply conditions of the readout circuits 2a and 2b can be different. In the example illustrated in FIG. 1, the same reference voltage $V_{REF}$ is applied to readout circuits 2a and 2b.

The first photodetector 1a is electrically connected to a first electric capacitor 3a. The second photodetector 1b is electrically connected to a second electric capacitor 3b which is distinct from the first electric capacitor 3a. The two integration capacitors 3a and 3b are connected to the two photodetectors 1a and 1b so as to store the electric charges emitted by their associated photodetector 1. Depending on the embodiments, the connection between the photodetector and the electric capacitor can be achieved by means of a direct connection or by means of an indirect connection, for example by means of a bias transistor.

Each readout circuit 2 advantageously comprises a reset circuit 5 which is configured to reset the load, here the integration capacitor 3. Reset can be performed by short-circuiting the two electrodes of the capacitor 3 or by applying the same potential on the two electrodes. In a particularly compact embodiment, reset of the capacitor 3 is performed by means of a switch which short-circuits the two electrodes of the capacitor, for example by means of a transistor.

Each readout circuit 2a and 2b is configured to define at least first and second different configurations. The first and second configurations comprise an acquisition configuration where the electric charges emitted by the photodetector are stored in the capacitive load. The first and second configurations also comprise a reset configuration where the capacitive load is placed in a predefined state.

Actuation of the readout circuit 2 enables at least a first data acquisition phase and a second reset phase of the integration capacitor 3 to be defined, within a predefined time period also called a frame. Depending on the embodiments, reset can be performed, in a frame, before acquisition or after acquisition.

During an acquisition phase, the two photodetectors 1a and 1b generate electric charges which are stored in their associated integration capacitor 3. The electric charges emitted by the photodetector 1 are stored in the integration capacitor 3, which generates a potential difference at the terminals of the integration capacitor 3. This potential difference is then measured and transmitted from the output S to a processing circuit 6. The integration capacitor 3 is reset to enable a new acquisition phase to be performed.

In advantageous manner, the processing circuit 6 is common to readout circuits 2a and 2b. As a variant, different processing circuits 6 can be associated with readout circuits 2a and 2b.

It is apparent that the potential difference is directly a function of the quantity of electric charges emitted by the photodetector 1 and of the electric capacitance value associated with the capacitor 3. It is therefore important to define the value of the integration capacitor 3 according to the quantity of electric charges to be stored by capacitor 3 and the voltage range which has to the measured at the terminals of capacitor 3. These constraints define the quantity of photons to be detected and in a certain manner the maximum duration of the acquisition phase, as saturating the integration capacitor 3 by sending too many electric charges has to be avoided. It is also advantageous to store a sufficient number of electric charges in order to generate a voltage difference that is able to be measured. Integrating a small number of electric charges makes analysis of the signal with respect to the noise level difficult to perform.

The detection device is configured so as to be able to be used for different illumination conditions in one or more different spectral bands. The acquisition and reset phases are bounded by an acquisition window also called frame. The acquisition window corresponds to the maximum authorised acquisition time for all the photodetectors 1 and to reset of the readout circuit, here the capacitors 3. In general manner, the quantity of photons detected and collected in the form of electric charges can be controlled, within the frame, by means of the maximum acquisition time for the two readout circuits 2a and 2b.

If the observed scene is very well lit, it is possible to work with a short frame, i.e. with a high refresh rate. If on the other hand the observed scene is not well lit, the frame has to be lengthened so as to collect a larger quantity of photons and therefore of electric charges. Adjustment of the frame influences operation of all the readout circuits 2. The frame is linked to the image acquisition and processing rate.

On the other hand, if a flux difference exists between the two different spectral bands, it is advantageous to provide a complementary adjustment device. This adjustment device enables the integration time of the first photodetector 1a to be adjusted with respect to the second photodetector 1b without modifying the frame.

For example, under a first condition, it is possible to detect a high flux in the first spectral band and a low flux in the second spectral band. Under a second condition, it is possible to detect a high flux in the second spectral band and a low flux in the first spectral band. It is therefore important to dissociate the acquisition conditions of the different photodetectors 1a and 1b in order to make the readout circuits 2a and 2b operate in a preferential operating range which is suitable for the different illumination conditions proposed by the observed scene. Dissociation of the acquisition conditions between the photodetectors is achieved by adjusting the acquisition time, i.e. the integration time of the photodetectors 1 within an integration time window, i.e. a frame.

Adjustment of the acquisition time is also advantageous when the first and second photodetectors 1a and 1b are sensitive to the same spectral band. If the flux presents a great variability in time or in the observed scene within one and the same spectral band, it is advantageous to use two different integration periods in order to adapt to this variability. It may be advantageous to distinguish between the areas of high signal disparity in an observed scene and to allocate a suitable integration time to them. By using a short integration time, the part of the image having a high flux can be usable without penalising the part of the image with a low flux. In the prior art, if the integration time is common to all the photodetectors and corresponds to a short integration time, the part of the image having a high flux is usable and the part of the image having a low flux will be associated with a disadvantageous signal-to-noise ratio. On the other hand, if the integration time is common to all the photodetectors and corresponds to a long integration time, the part of the image having a low flux is usable and the part of the image having a high flux is associated with a saturated signal that is difficult to use.

It is advantageous to dissociate operation of the first and second photodetectors 1a and 1b in a matrix where a first group of photodetectors observes a high flux area and where a second group of photodetectors observes a low flux area.

According to the embodiments, the first and second photodetectors are uniformly distributed in a photodetector matrix. In an alternative embodiment, the first and second photodetectors are not uniformly distributed in the photodetector matrix, for example the first photodetectors form a central area whereas the second photodetectors form a peripheral area which surrounds the central area.

To obtain a greater freedom in operation of the readout circuits 2, the first and second readout circuits 2a and 2b are connected to synchronisation circuits 7a and 7b.

Each synchronisation circuit 7 commands a plurality of phases of operation in the frame, in particular an acquisition phase and a reset phase. The synchronisation circuit 7 can also command at least one other additional operating phase. In this way, the actions of the different readout circuits 2a/2b are defined by means of the synchronisation circuits 7a/7b.

In the illustrated embodiment, the first synchronisation circuit 7a is connected to the first readout circuit 2a and the second synchronisation circuit 7b is connected to the second readout circuit 2b.

However, it is advantageous to provide for the first synchronisation circuit 7a to be connected to a plurality of first readout circuits 2a which are actuated simultaneously in a frame. In the same way, it is advantageous to provide for the second synchronisation circuit 7b to be connected to a plurality of second readout circuits 2b which are also actuated simultaneously.

As indicated previously, in order to be able to compare the data emitted by the two photodetectors 1a and 1b sensitive to two different or identical spectral bands, it is advantageous to keep a temporal coherence between the acquisition phases. It is therefore advantageous for the readout circuits 2a and 2b to work with the same frame.

Temporal coherence can be obtained by synchronising the acquisition phases between the different photodetectors 1a and 1b. The acquisition time is then identical from one photodetector to the other, and the acquisition phases are initiated and terminated at the same time. The differences of operation can be limited to a time difference in the reset phases and possibly in introduction of an additional phase for example for readout circuit 2a and not for readout circuit 2b.

Temporal coherence can also be obtained by synchronising the start times of the acquisition phase for photodetectors 1a and 1b. The acquisition times of the readout circuits 2a and 2b are different. It is also possible to provide for the reset times of the readout circuits 2a and 2b to be different. Identical reset times for readout circuits 2a and 2b are also possible. An additional operating phase can be introduced in one of the readout circuits 2a or 2b to compensate differences between the activation and/or reset times. Advantageously, the duration of a frame is constant for photodetectors 1a and 1b.

In more general manner, temporal coherence can also be obtained by providing for the duration of the acquisition phase of photodetector 1a to be encompassed in the duration of the acquisition phase of photodetector 1b.

In order to present a compact detection device, it is advantageous to keep a small number of lines serving the purpose of performing parameter setting of the different synchronisation circuits 7 and of propagation of the command and synchronisation signals.

Synchronisation of the synchronisation circuits 7a and 7b is advantageously achieved by means of the generator 8 of synchronisation signal SYNC which is connected to the different synchronisation circuits 7. The generator 8 is configured to generate a synchronisation signal SYNC which acts as a time base. This synchronisation signal SYNC is received by the different synchronisation circuits 7 which process this signal. In advantageous manner, this synchronisation signal SYNC is used to define the frame.

In advantageous manner, the generator 8 of synchronisation signal SYNC is mutualised to all the synchronisation circuits 7 in order to gain in compactness and reliability.

In the embodiment illustrated in FIG. 1, the first readout circuit 2a is connected to the first synchronisation circuit 7a which is configured to define the frame and also the acquisition and reset phases. The first synchronisation circuit 7a is connected to the generator 8 of synchronisation signal SYNC.

The second readout circuit 2b is connected to the second synchronisation circuit 7b which is configured to define the frame and also the acquisition and reset phases. The second synchronisation circuit 7b is connected to the generator 8 of synchronisation signal SYNC.

The first and second synchronisation circuits 7a and 7b are advantageously connected to the synchronisation line which performs transit of the synchronisation signal SYNC.

In a particular embodiment, the generator 8 is configured to emit a first pattern in the synchronisation signal SYNC. Synchronisation of the different synchronisation circuits 7a, 7b is performed by means of detection of the first predefined pattern in the synchronisation signal SYNC by circuits 7a and 7b. This first pattern advantageously enables the start or end of a frame to be defined.

For example, detection of the first predefined pattern enables the frame to be initiated. In this way, the same frame is applied by all the synchronisation circuit 7a, 7b, and therefore by all the readout circuits 2a, 2b, which facilitates a temporal coherence between the different photodetectors 1.

When the first synchronisation circuit 7a detects the presence of the first pattern, it commands a first action. This first action can be a change of state command of the readout circuit 2a and/or another action, for example a search for a second signal initiating a change of state.

Starting of a frame can be associated with the same action for readout circuits 2a and 2b, for example starting or termination of the acquisition phase or of the reset phase.

As a variant, starting of a frame can be associated with an action for one of the readout circuits 2a and 2b and with an absence of action for the other of the readout circuits which waits for another signal to command an action in delayed manner.

In advantageous manner, the different synchronisation circuits 7a, 7b are also connected to a generator 9 of a clock signal CLK which is a second time base. In advantageous manner, the generator 9 will emit a second predefined pattern in repetitive and regular manner. The generator 9 of clock signal CLK is mutualised to a large number of components of the detection device and preferably to at least all the circuits 7a and 7b, which reduces its energy impact.

Generator 8 is different from generator 9. In a particular embodiment, generator 8 can be a signal generator referred to as "external" which is resynchronised by means of generator 9 referred to as "internal".

The synchronisation circuit 7a, 7b will detect the presence of this second predefined pattern and calculate the number of occurrences of this second pattern starting from a predefined moment, for example detection of a precise pattern coming from the generator 8. Once the number of occurrences has reached a predefined value, the synchronisation circuit 7a, 7b will engage an action with the readout circuit 2a, 2b, for example: initiate acquisition phase, terminate acquisition phase, initiate reset phase or terminate reset phase.

In advantageous manner, the generator 9 of clock signal CLK is also used to manage synchronisation of the logic circuits that are present in the detection device, for example the registers, adders, comparators and other circuits which receive data from the processing circuit.

To sum up, the first synchronisation circuit 7a is connected to the first readout circuit 2a, to the generator 8 of synchronisation signal SYNC and to the generator 9 of clock signal CLK. The same is the case for the second synchronisation circuit 7b.

The threshold value which has to be compared with the number of occurrences of the second pattern can be recorded in a memory 10 also called register of the synchronisation circuit 7a, 7b. In this way, adjustment of the acquisition or reset time can be performed simply by changing the value recorded in the memory 10.

If the register 10a of circuit 7a has a different value from the register 10b of circuit 7b, the readout circuits 2a and 2b are synchronised on starting of the frame and for example on starting of the acquisition phase or on starting of the reset phase. The other operating steps of the readout circuits 2a, 2b in the frame are linked differently with respect to the synchronisation signal.

This embodiment is particularly compact as it enables the acquisition and/or reset time to be changed simply by using two different signal lines and a memory.

In a particular embodiment, the first synchronisation circuit 7a is configured in such a way as to
- define the frame of the readout circuit 2a by means of detection of a first predefined pattern of the synchronisation signal SYNC,
- count the number of occurrences of a second predefined pattern in the clock signal CLK,
- initiate or terminate a data acquisition phase within the frame when the number of occurrences of the second predefined pattern in the clock signal CLK is equal to a first threshold value recorded in a register 10 of the first synchronisation circuit 7a.

In order to command an action of the readout circuit 2a, the synchronisation circuit 7a detects and counts the number of occurrences of the second predefined pattern. Once the number of occurrences has reached the threshold value, the synchronisation circuit 7a switches between the acquisition phase and the reset phase or vice versa. It is also possible to switch to a standby phase or from a standby phase.

Depending on the embodiments, detection of the threshold value can result in termination of the reset phase and, from this moment on, the charges emitted by the photodetector 1 are stored in the integration capacitor 3. In other possible cases, once the threshold value has been reached, disconnection of the photodetector 1 from the integration capacitor 3 is performed and reset can take place later. As a variant, when the threshold value is reached, starting of the reset phase can be initiated, the voltage at the terminals of the capacitor 3 is measured regularly and the last measurement before reset is used by the processing circuit 6. It is further possible, when the threshold value is reached, to provide for the synchronisation circuit 7 to command connection between the photodetector 1 and the integration capacitor 3.

What has just been set out regarding synchronisation circuit 7a can also be applied to synchronisation circuit 7b.

It is particularly advantageous to use a second pattern common to the different synchronisation circuits 7a and 7b and to use the number of occurrences to differentiate between the actions to be engaged on the first readout circuit 2a and on the second readout circuit 2b.

The second pattern is advantageously a simple pattern, for example a leading edge, a trailing edge or a pulse peak, i.e. a leading edge separated from a trailing edge by a high or low state having a predefined duration.

The use of more complex patterns to differentiate between the different synchronisation circuits 7a and 7b is possible but requires the use of more complex circuits. This also requires more powerful synchronisation circuits to ensure that the synchronisation circuits do in fact detect the right pattern associated with the right synchronisation circuit. It is also more complicated to perform synchronisation of certain actions on the different readout circuits as different patterns cannot be sent simultaneously by generator 9 or by generator 8.

In an advantageous embodiment, the readout circuit 2 is configured in such a way that the photodetector 1 is connected to the integration capacitor 3 except during the reset phase. This particular configuration enables acquisition to be engaged as soon as reset has been terminated. In this embodiment there are only two phases, i.e. a reset phase and an acquisition phase. This embodiment is particularly advantageous as it is very compact. However, there is no standby phase where the capacitor 3 is not connected to the photodetector 1 and stores the electric charges of the previous acquisition phase.

In the embodiment illustrated in FIG. 1, the synchronisation circuit 7 acts on the reset circuit 5 so as to switch between the reset phases and acquisition phases. The embodiment of FIG. 1 enables a configuration with only one acquisition phase and one reset phase to be achieved. If the detection device is configured to only switch between reset phases and acquisition phases, the value registered in the memory 10 enables the integration time and the reset time to be defined precisely.

It is advantageous to provide for the first pattern emitted by the generator 8 to be associated with an action of the synchronisation circuit 7, for example the start of the reset phase or the end of the reset phase. The first pattern enables the acquisition phase or the reset phase to be synchronised. The other phase of operation of the readout circuit 2a, 2b is defined by means of the number of occurrences of the second pattern generated by the generator 9.

As a variant, the first pattern emitted by the generator 8 is not associated with an action of the synchronisation circuit 7. Detection of the first pattern acts as point of departure for countdown of the number of occurrences of the second pattern. It is then advantageous to use another threshold value and another comparison to engage another action of the readout circuit.

In an alternative embodiment, the generator 8 can emit an additional pattern which imposes triggering of an action in the synchronisation circuits 7a, 7b and therefore in the readout circuits 2a, 2b. The additional pattern is different from the first pattern and the action associated with the additional pattern is different from the action associated with the first pattern. The additional pattern can impose start of the acquisition phase or start of the reset phase or another action.

In a particular embodiment, the second synchronisation circuit 7b may not be provided with the memory 10 storing the threshold value. Adjustment to the illumination conditions can be performed by the generator 8 for the second readout circuit 2b. The generator 8 will emit a first pattern and an additional pattern which will trigger the acquisition phase and the reset phase. In this case, the frame is advantageously defined so that the readout circuit 2b adapts to the illumination conditions in the second spectral band so that the readout circuit 2b operates in a preferential voltage range at the terminals of the capacitor. The first synchronisation circuit 7a enables the acquisition conditions to be adjusted so that the readout circuit 2a also operates in a preferential voltage range at the terminals of the capacitor.

Adjustment of the operation of the first readout circuit 2a is on the other hand performed by adjusting the threshold value in the memory 10 of the first synchronisation circuit 7a. One of the patterns generated by the generator 8 will have no effect on the first readout circuit 2a which will have already switched when the number of occurrences of the second pattern has reached its threshold value.

In an alternative embodiment which can be combined with the previous embodiments, counting of the second predefined patterns in the clock signal CLK can be conditioned by detection of a third predefined pattern in the synchronisation signal SYNC and generated by the generator 8. This particularity enables the size of the memory 10 containing the threshold value to be limited. Detection of the first pattern by the synchronisation circuit 7 engages an action and this action is terminated when the synchronisation circuit 7 detects the number of occurrences of the second pattern after detection of the third pattern.

In one embodiment, the third predefined pattern is identical to the first predefined pattern which makes it easier to engineer the generator 8. In another embodiment, the third predefined pattern is different from the first pattern. The first pattern and/or the third pattern can be a leading edge, a trailing edge or a pulse. In a particular case, the threshold value recorded in the memory 10 of the first synchronisation circuit 7a cannot be changed and adjustment of the acquisition or reset time is performed by simply changing the position of the third predefined pattern in the frame, i.e. the time at which the third predefined pattern occurs.

In an advantageous embodiment, the first pattern, second pattern and third pattern are chosen from leading or trailing edges, which facilitates detection of the patterns and enables a compact device to be obtained. If the leading edge is located in the middle of the period between two trailing edges, the value of the memory can be configured to contain as a maximum the number of occurrences in a half-period.

In advantageous manner, the leading and trailing edges of the synchronisation signal SYNC are offset from the leading and trailing edges of the clock signal CLK to facilitate detections and switchings.

In one embodiment, the first and third patterns are a leading edge of the synchronisation signal SYNC. In another embodiment, the first and third patterns are a trailing edge of the synchronisation signal SYNC.

In an alternative embodiment, another more complex pattern cart be detected in the clock signal CLK and/or in the synchronisation signal SYNC.

In a particular embodiment, if the detection circuit comprises several first readout circuits 2a, all the first readout circuits 2a are connected to the same first synchronisation circuit 7a. In this way, all the first readout circuits 2a present the same integration time and are synchronised. The first synchronisation circuit 7a is mutualised to gain in compactness.

This solution is considerably more compact than an embodiment in which one synchronisation circuit 7a is dedicated to each first readout circuit 2a.

This solution is also much less energy-consuming on account of the fact that the number of synchronisation circuits 7a is reduced.

In yet another particular embodiment, a plurality of readout circuits 2a are connected to a specific first synchronisation circuit 7a. In this way, it is possible to adjust the integration time by groups of first readout circuits 2a.

In an advantageous embodiment illustrated in FIG. 1, the second synchronisation circuit 7b is also provided with a memory 10 storing a second threshold value and is configured to operate like the first synchronisation circuit 7a.

The second synchronisation circuit 7b is connected to the second readout circuit 2b, to the generator 8 of the synchronisation signal and to the generator 9 of the clock signal. The second synchronisation circuit 7b is configured in such a way as to
define the frame by means of detection of the first predefined pattern of synchronisation signal SYNC,
count the number of occurrences of a fourth predefined pattern in the clock signal CLK,
initiate or terminate a data acquisition phase within a frame when the number of occurrences of the fourth predefined pattern in the clock signal is equal to a second threshold value recorded in a register 10 of the second synchronisation circuit 7b.

In an advantageous embodiment, the fourth predefined pattern is identical to the second predefined pattern which facilitates the use of clock signal CLK for its other applications. As a variant, the fourth pattern may be different from the second pattern.

The use of a second synchronisation circuit 7b with a memory 10 storing a threshold value enhances adjustment to the illumination conditions. All the embodiments presented for the first synchronisation circuit 7a can be applied to the second synchronisation circuit 7b.

It is advantageous to have a second synchronisation circuit 7b with an adjustable acquisition time if at least three different spectral bands are detected and/or if an additional flexibility is required with respect to the minimum duration of the frame. However, to command three different groups of photodetectors, it is particularly advantageous to use three different synchronisation circuits.

In general manner, to command N different types of photodetectors which are designed to detect N different spectral bands, it is advantageous for each type of photodetector to be associated with a dedicated synchronisation circuit, which makes for a great ease of use under a wide variety of illumination conditions.

In advantageous manner, the detection circuit is configured to present as many different integration times as analysed spectral bands. Two photodetectors associated with one and the same spectral band advantageously present the same acquisition time in order to facilitate data comparison.

In advantageous manner, reset of the integration capacitor 3 corresponds to the start of a frame and the same first pattern is chosen for all the readout circuits 2a, 2b so as to ensure a temporal coherence. In this manner, it is particularly easy to set up a frame common to all the readout circuits 2a, 2b, i.e. to all the photodetectors. In advantageous manner, start of a frame is followed by measurement of the data relating to the previous frame and then by reset of the integration capacitor to prepare the next acquisition.

In a preferential embodiment, it is possible to force switching of the configuration of the readout circuit, for example start or termination of the acquisition phase or start or termination of the reset phase, if the synchronisation circuit detects a fifth predefined pattern in synchronisation signal SYNC. The fifth pattern is also called priority pattern. In particularly advantageous manner, if the synchronisation circuit is configured to count the occurrences of the second pattern right from the start of the frame, it may be advantageous to force start of acquisition or termination of reset on detection of the third code which advantageously takes place at mid-period. Forcing start of acquisition or start of reset makes it possible to define a predefined integration time which can be minimal or maximal to counteract for example malfunctioning of a register 10.

Operation of the detection circuit can be presented in the following manner:
providing the detection device comprising:
a first photodetector 1a sensitive to a first wavelength,
a second photodetector 1b sensitive to a second wavelength,
a first readout circuit 2a provided with a first integration capacitor 3a connected to the first photodetector 1a so as to store the electric charges emitted by the first photodetector 1a,
a second readout circuit 2b provided with a second integration capacitor 3b connected to the second photodetector 1b so as to store the electric charges emitted by the second photodetector 1b,
first and second reset circuits 5a and 5b configured so as to respectively reset the first integration capacitor 3a and the second integration capacitor 3b,
detecting a first predefined pattern in synchronisation signal SYNC to initiate a frame for the first and second readout circuits,
counting the number of occurrences of a second predefined pattern in a clock signal CLK,
comparing said number of occurrences with a threshold value, when the number of occurrences reaches the threshold value, the first readout circuit 2a initiates or terminates a data acquisition phase.

The generator 8 of synchronisation signal SYNC emits a first predefined pattern in the synchronisation signal SYNC. The synchronisation circuits 7a and 7b detect the first predefined pattern which initiates a new frame for the readout circuits 2a and 2b.

At least the first synchronisation circuit 7a counts the number of occurrences of the second predefined pattern in the clock signal CLK. The number of occurrences is compared with the threshold value present in the memory 10. When the number of occurrences reaches the threshold value, the first synchronisation circuit 7a commands an action on the first readout circuit 2a which can for example initiate or terminate the data acquisition phase or the reset phase.

Figure 2:
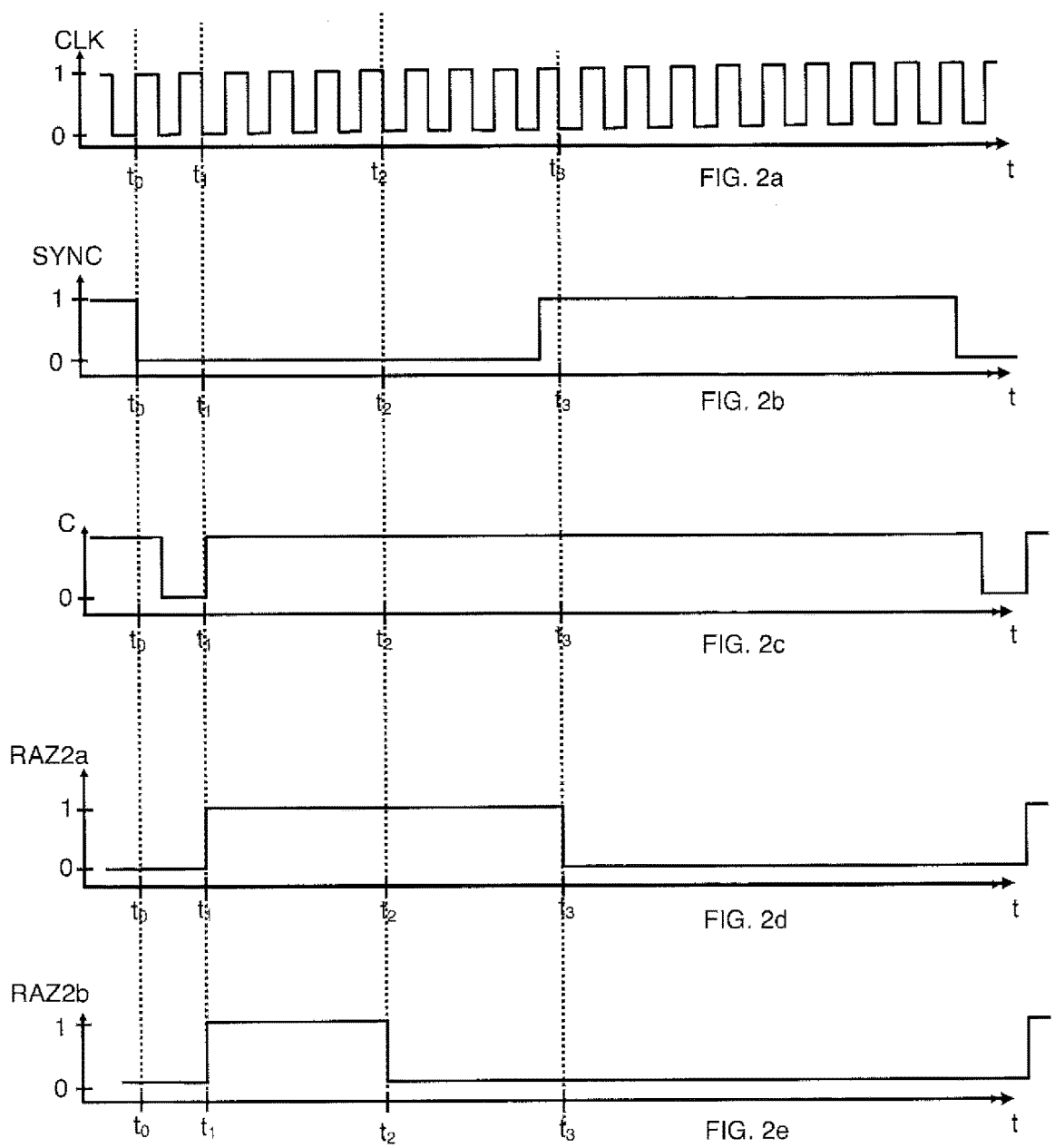
FIGS. 2a-2e represent timing diagrams representative of different phases of a first operating mode of the detection device, for certain constituent components.
Figure 3:
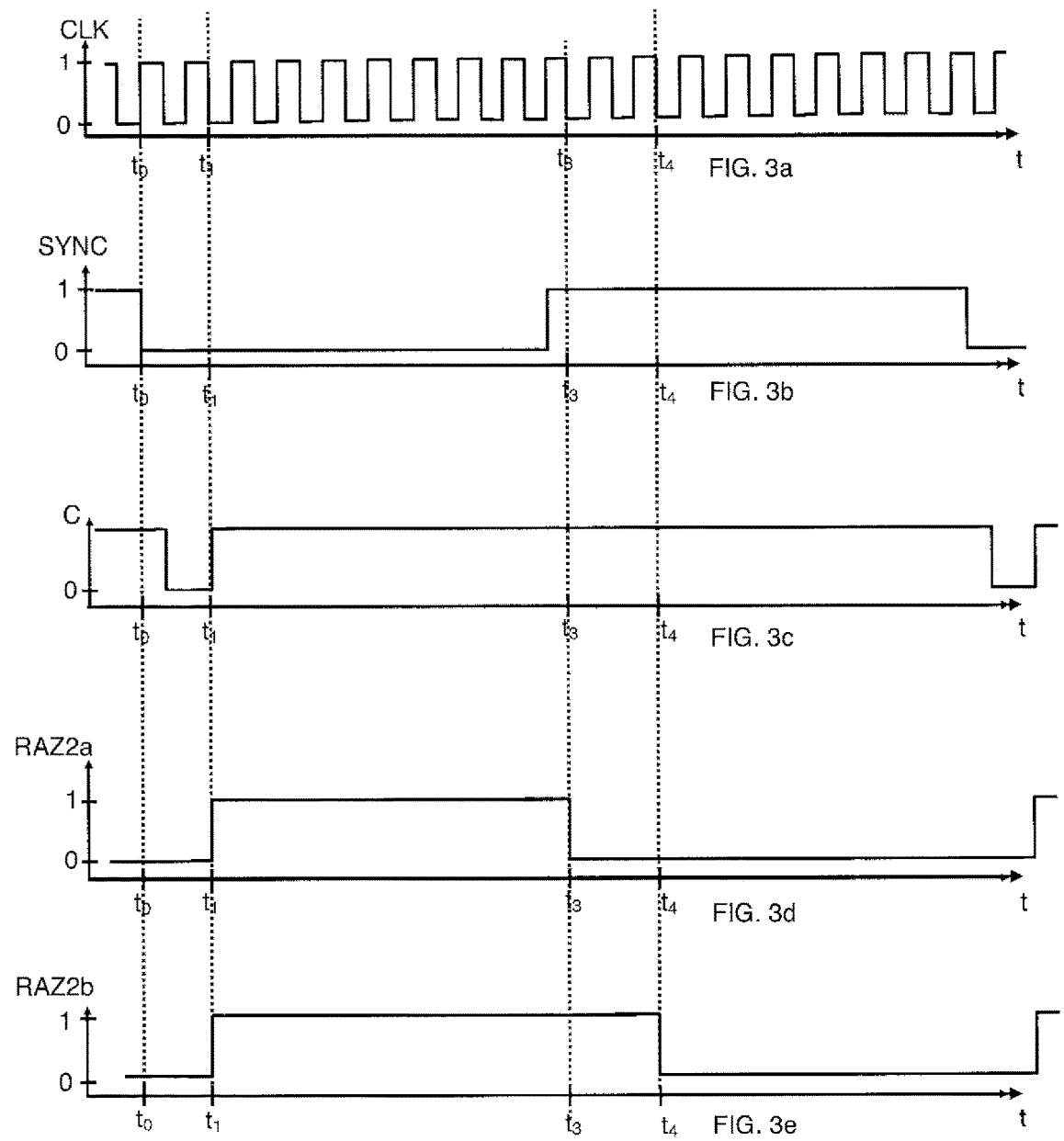
FIGS. 3a-3e represent timing diagrams representative of different phases of a second operating mode of the detection device, for certain constituent components.

In the operating mode illustrated in FIGS. 2a-2e, several signals are represented. Clock signal CLK is represented in FIG. 2a. Synchronisation signal SYNC is represented in FIG. 2b. Counter signal C is represented in FIG. 2c. Reset signal of capacitor 3a is represented in FIG. 2d. Reset signal of capacitor 3b is represented in FIG. 2e.

At a time $t_0$, the generator 8 of synchronisation signal SYNC emits a first predefined pattern, here a trailing edge.

The first and second synchronisation circuits 7a, 7b detect this first predefined pattern announcing the start of a new frame.

In the particular example illustrated in FIGS. 2a-2e, the first and second synchronisation circuits 7a, 7b trigger measurement of the data stored in the integration capacitor 3 (represented by counter C in FIG. 2c). The electric charges stored in the capacitor 3 are measured and the data is transmitted to the processing circuit 6. The end of measurement by counter C is represented by time $t_1$. At time $t_1$, the first and second synchronisation circuits 7a, 7b trigger reset of first integration capacitor 3a and of second integration capacitor 3b. The two signals RAZ2a and RAZ2b both switch to high state.

In the illustrated embodiment, the generator 8 emits a third pattern represented by a leading edge (third pattern) on the synchronisation signal SYNC. The first and second synchronisation circuits 7a and 7b detect the third pattern and count the occurrences of the second and fourth patterns from this time. In the illustrated example, the first synchronisation circuit 7a is configured to terminate the reset phase of the capacitor 3a (FIG. 2d) at time $t_3$ after detection of a single second pattern, here a trailing edge, on the clock signal CLK which follows detection of a third pattern, here a leading edge, on synchronisation signal SYNC (FIG. 2b).

In the illustrated embodiment, the second synchronisation circuit 7b is configured to terminate the reset phase of capacitor 3b (FIG. 2e) at time $t_2$ after detection of six second patterns, here trailing edges, on the clock signal CLK which follow detection of a first pattern, here a trailing edge, on synchronisation signal SYNC, i.e. right from the start of the frame.

In the illustrated configuration, the frame is divided into an acquisition time and a reset time. The first readout circuit 2a therefore has an acquisition time (RAZ2a=0) which is shorter than the acquisition time of the second readout circuit 2b (RAZ2b=0).

In a particular example illustrated in FIGS. 3a-3e, the first and second synchronisation circuits 7a and 7b trigger measurement of the data stored in the integration capacitor 3 (represented by counter C in FIG. 2c). End of measurement by counter C is represented by time $t_1$. At time $t_1$, the first and second synchronisation circuits 7a and 7b then trigger reset of the first integration capacitor 3a and of the second integration capacitor 3b. The two signals RAZ2a and RAZ2b both switch to high state.

In the illustrated embodiment, the first synchronisation circuit 7a is configured to terminate the reset phase of capacitor 3a (FIG. 3d) at time $t_3$ after detection of a second pattern, here a trailing edge, on the clock signal CLK which follows detection of a third pattern, here a leading edge, on synchronisation signal SYNC.

In the illustrated embodiment, the second synchronisation circuit 7b is configured to terminate the reset phase of the capacitor 3b (FIG. 3e) at time $t_4$ after detection of three second patterns, here trailing edges, on the clock signal CLK which follow detection of a third pattern, here a leading edge, on synchronisation signal SYNC, i.e. as from the start of the second part of the period.

In the illustrated configuration, the frame is divided into an acquisition time and a reset time. First readout circuit 2a therefore has an acquisition time which is longer than the acquisition time of second readout circuit 2b.

In the different illustrated embodiments, the detection circuit comprises first and second photodetectors associated with first and second readout circuits as well as with first and second synchronisation circuits. As indicated in the foregoing, the detection circuit can be used on more than two spectral bands.

It is then advantageous to provide N additional photodetectors 1N in addition to the first and second photodetectors. The N additional photodetectors 1N are sensitive to N additional wavelengths which are advantageously different from the first and second wavelengths. N is an integer greater than or equal to 1. As an alternative, it is also possible to provide for the additional wavelengths to be identical to the first wavelength and/or to the second wavelength.

The N additional photodetectors are associated with N additional readout circuits 2N each provided with an integration capacitor. Readout circuit 2N of rank N is connected to the additional photodetector 1N of rank N and is configured to define at least first and second different configurations comprising an acquisition configuration where electric charges emitted by the additional photodetector 1N of rank N are stored in the integration capacitor 3N of rank N and a reset configuration of the integration capacitor 3N of rank N.

The device also comprises N synchronisation circuits 7N which are connected to the N readout circuits 2N, to the generator 8 of the synchronisation signal and to the generator 9 of the clock signal.

The synchronisation circuit 7N of rank N is configured in such a way as to
command an action of the synchronisation circuit 7N of rank N in response to detection of a first predefined pattern emitted by the generator 8 of synchronisation signal SYNC and
count a number of occurrences of a predefined additional pattern of rank N in the clock signal CLK and
switch the readout circuit 2N of rank N from an initial configuration to another configuration when the number of occurrences of a predefined additional pattern of rank N in the clock signal CLK is equal to an Nth threshold value recorded in a register 10 of the synchronisation circuit 7N of rank N, the initial configuration or the other configuration being chosen from the first configuration and the second configuration.

In this way it is then possible to provide a detection device which is able to detect electromagnetic radiation in at least two different spectral bands. It is also possible to dissociate photodetectors within a spectral band in order to separate high flux areas and low flux areas.

The predefined additional pattern of rank N can be identical to or different from the second pattern and/or the fourth pattern.

The functionalities presented for the first synchronisation circuit 7a and/or for the second synchronisation circuit 7b can be applied to the synchronisation circuit 7N of rank N.

Figure 4:
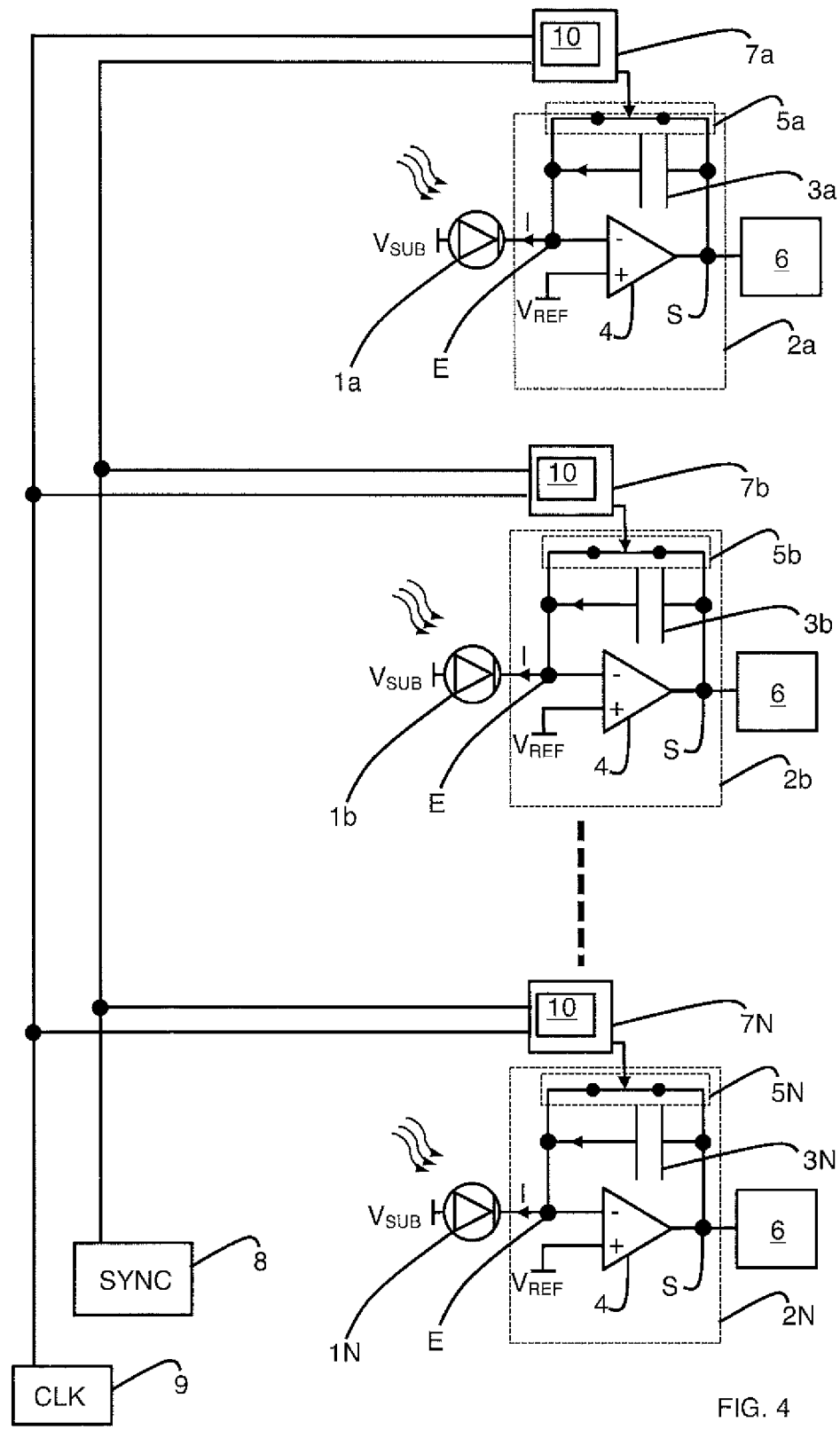
FIG. 4 represents, in schematic manner, an embodiment of a detection device provided with several photodetectors.

Such an embodiment is illustrated in FIG. 4.

The invention claimed is:
1. Detection device comprising:
a first photodetector and a second photodetector respectively sensitive to a first wavelength and a second wavelength,
a first readout circuit provided with a first integration capacitor connected to the first photodetector and configured to define at least first and second different configurations comprising an acquisition configuration where electric charges emitted by the first photodetector are stored in the first integration capacitor and a reset configuration where the first integration capacitor is reset, a second readout circuit provided with a second integration capacitor connected to the second photodetector and configured to define at least first and second different configurations comprising an acquisition configuration where electric charges emitted by the second photodetector are stored in the second integration capacitor and a reset configuration where the second integration capacitor is reset,
a generator of synchronisation signal,
a generator of clock signal,
a first synchronisation circuit connected to the first readout circuit, to the generator of synchronisation signal and to the generator of clock signal, the first synchronisation circuit being configured in such a way as to
command an action of the first synchronisation circuit in response to detection of a first predefined pattern emitted by the generator of synchronisation signal and
count a number of occurrences of a second predefined pattern in the clock signal and
switch the first readout circuit from an initial configuration to an other configuration when the number of occurrences of the second predefined pattern is equal to a first threshold value recorded in a register of the first synchronisation circuit, the initial configuration or the other configuration being chosen at least from the first configuration and the second configuration,
a second synchronisation circuit connected to the second readout circuit, to the synchronisation signal generator and to the clock signal generator, the second synchronisation circuit being configured in such a way as to
command an action of the second synchronisation circuit in response to detection of the first predefined pattern emitted by the generator of synchronisation signal and
count a number of occurrences of a fourth predefined pattern in the clock signal and
switch the second readout circuit from an initial configuration to an other configuration when the number of occurrences of the fourth predefined pattern in the clock signal is equal to a second threshold value recorded in a register of the second synchronisation circuit, the initial configuration or the other configuration being chosen from the first configuration and the second configuration, and
wherein the fourth predefined pattern is different from the second predefined pattern or the first threshold value is different from the second threshold value.

2. Detection device according to claim 1 wherein the first synchronisation circuit is configured so as to initiate counting of the number of occurrences of the second predefined pattern in response to detection of the first predefined pattern in the synchronisation signal.

3. Detection device according to claim 1 wherein the first synchronisation circuit is configured so as to initiate counting of the number of occurrences of the second predefined pattern in response to detection of a third predefined pattern in the synchronisation signal and to command switching of the configuration of the first readout circuit by means of the first synchronisation circuit in response to detection of a first predefined pattern.

4. Detection device according to claim 1 wherein the first synchronisation circuit is configured so as to command switching of the configuration of the first readout circuit in response to detection of a priority pattern in the synchronisation signal, the priority pattern being different from the first predefined pattern.

5. Detection device according to claim 4 wherein switching of the configuration of the first readout circuit in response to detection of the priority pattern is configured to initiate or terminate the acquisition phase.

6. Detection device according to claim 1 wherein the fourth predefined pattern is identical to the second predefined pattern.

7. Detection device according to claim 1 wherein the first wavelength is identical to the second wavelength.

8. Detection device according to claim 7 wherein the first threshold value is different from the second threshold value.

9. Detection device according to claim 1 wherein the first wavelength is different from the second wavelength.

10. Detection device according to claim 1 comprising:
N additional photodetectors sensitive to N additional wavelengths different from the first and second wavelengths, with N an integer greater than or equal to 1,
N readout circuits each provided with an integration capacitor, the readout circuit of rank N being connected to the additional photodetector of rank N and configured to define at least first and second different configurations comprising an acquisition configuration where electric charges emitted by the additional photodetector of rank N are stored in the integration capacitor of rank N and a reset configuration of the integration capacitor of rank N,
N synchronisation circuits connected to the N readout circuits, to the synchronisation signal generator and to the clock signal generator, the synchronisation circuit of rank N being configured in such a way as to
command an action of the synchronisation circuit of rank N in response to detection of a first predefined pattern emitted by the generator of synchronisation signal and
count a number of occurrences of a predefined additional pattern of rank N in the clock signal and
switch the readout circuit of rank N from an initial configuration to another configuration when the number of occurrences of a predefined additional pattern of rank N in the clock signal is equal to an Nth threshold value recorded in a register of the synchronisation circuit of rank N, the initial configuration or the other configuration being chosen from the first configuration and the second configuration.

11. Detection device according to claim 1 wherein the first readout circuit is configured to perform reset of the first integration capacitor while the first photodetector is connected to the first integration capacitor and in that the first synchronisation circuit is configured so as to initiate the acquisition phase by terminating the reset phase.

12. Detection device according to claim 1 wherein the first predefined pattern is a leading edge and wherein the third predefined pattern is a trailing edge.

13. Detection device according to claim 1 wherein the first predefined pattern is a trailing edge and wherein the third predefined pattern is a leading edge.

14. Detection device according to claim 1 wherein the second predefined pattern is a trailing edge or a leading edge.

15. Detection device according to claim 1 comprising a plurality of first photodetectors connected to a plurality of first readout circuits and a plurality of second photodetectors connected to a plurality of second readout circuits, the plurality of first readout circuits being connected to the first synchronisation circuit and the plurality of second readout circuits being connected to the second synchronisation circuit.

16. Detection device according to claim 15 wherein the plurality of second readout circuits is connected to the second synchronisation circuit.

17. Management method of a detection device comprising the following steps:
- providing the detection device comprising:
  - a first photodetector sensitive to a first wavelength,
  - a first readout circuit provided with a first integration capacitor connected to the first photodetector so as to store the electric charges emitted by the first photodetector, the first reset circuit is configured so as to respectively reset the first integration capacitor and the second integration capacitor and to enable storage of electric charges emitted by the photodetector in the first integration capacitor,
  - a second photodetector sensitive to a second wavelength,
  - a second readout circuit provided with a second integration capacitor connected to the second photodetector and configured to define at least first and second different configurations comprising an acquisition configuration where electric charges emitted by the second photodetector are stored in the second integration capacitor and a reset configuration of the second integration capacitor,
- detecting a first predefined pattern in a synchronisation signal to initiate a frame for the first and second readout circuits,
- counting a number of occurrences of a second predefined pattern and a number of occurrences of a fourth predefined pattern in a clock signal,
- comparing the number of occurrences of the second predefined pattern with a first threshold value, when the number of occurrences of the second predefined pattern reaches the first threshold value, the first readout circuit initiates or terminates a reset phase of the first integration capacitor or a data acquisition phase,
- comparing the number of occurrences of the fourth predefined pattern with a second threshold value, when the number of occurrences of the fourth predefined pattern reaches the second threshold value, the second readout circuit initiates or terminates a reset phase of the second integration capacitor or a data acquisition phase.

* * * * *